(No Model.)

A. F. SNYDER.
BELT TIGHTENER.

No. 587,877. Patented Aug. 10, 1897.

Witnesses:
E. S. Hacker
H. R. Stichy

Inventor.
Andrew F. Snyder

UNITED STATES PATENT OFFICE.

ANDREW F. SNYDER, OF CHICAGO, ILLINOIS.

BELT-TIGHTENER.

SPECIFICATION forming part of Letters Patent No. 587,877, dated August 10, 1897.

Application filed December 29, 1896. Serial No. 617,308. (No model.)

*To all whom it may concern:*

Be it known that I, ANDREW F. SNYDER, a citizen of the United States, residing at Chicago, in the county of Cook and State of Illinois, have invented certain new and useful Improvements in Belt-Tighteners, of which the following is a specification.

This invention relates to certain new and useful improvements in belt-tighteners, and has for its object to provide a simple, cheap, strong, durable, and quickly-adjusted belt clamp and tightener of that class designed to allow of the tightening of the belt without taking it from the pulleys.

The machine is made of iron or steel.

The invention is clearly illustrated in the accompanying drawings, which, with the letters of reference marked thereon, form a part of this specification, and in which—

Figure 1:
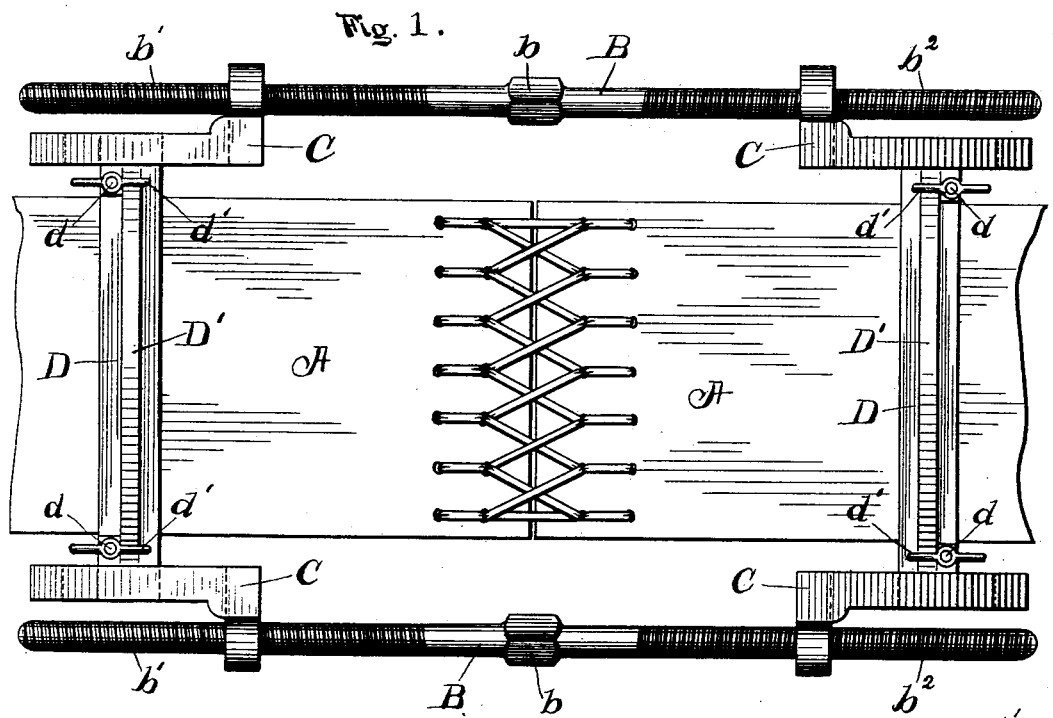
Figure 2:
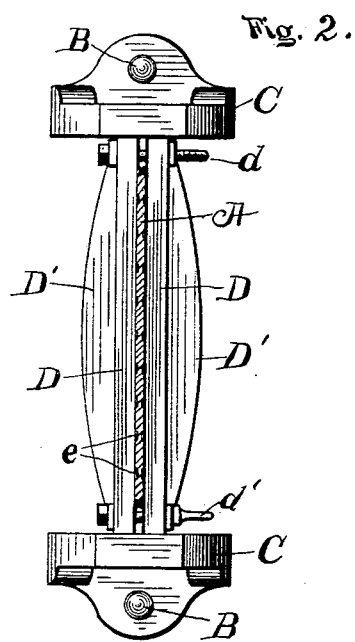
Figure 5:
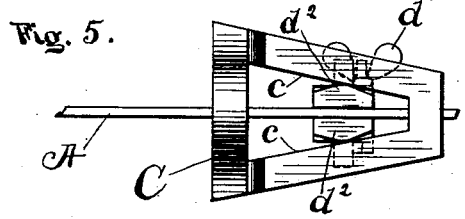
Figure 3:
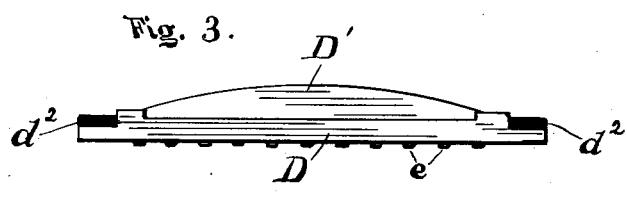
Figure 4:
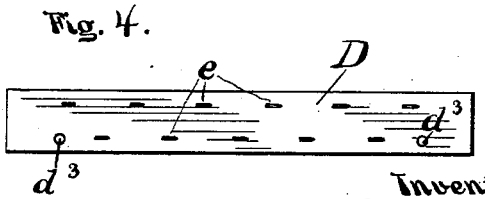

Figure 1 is a front view of my improved belt clamp and tightener shown applied to a belt. Fig. 2 is an end view of Fig. 1. Fig. 3 is a side view of cross-bar D. Fig. 4 is a face view of cross-bar D. Fig. 5 is a side view of lug C, showing ends of cross-bars $d^2$ $d^2$ shown in Fig. 3.

Similar letters refer to similar parts in the several views.

In Fig. 1, A A is the belt.

B B are the bolts with squares $b$ $b$ in the center.

$b'$ $b'$ and $b^2$ $b^2$ are right and left handed threads. Corresponding threads are tapped in the projection of lugs C C (shown in Fig. 2) and form a nut for bolts B B, and are for the purpose of drawing the belt together and tightening previous to lacing or making fast in any other manner. Bolts B B are the same as are used on ordinary belt-clamps.

C C are lugs made tapering, as shown in Fig. 5.

D D are cross-bars.

D' D' are braces of cross-bars D D and are raised in the center, as shown in Fig. 3.

$d$ $d$ are bolts with thumb-screws $d'$ $d'$, that hold the cross-bars D D in position before putting on lugs C C.

$d^3$ in Fig. 4 are bolt-holes for bolts $d$ $d$.

$e$ in Figs. 2, 3, and 4 are teeth. There are two rows, each row being alternate, as shown in Fig. 4, and are for the purpose of gripping the belt to prevent slipping.

Fig. 5 shows a combination of lug C and center-bearing ends $d^2$ $d^2$ of cross-bar D, as shown in Fig. 3. The taper opening of lug C is for a double purpose—first, of admitting a belt of any required thickness; second, of forcing cross-bars D D as close together as the belt will allow. This is accomplished by tightening the bolts B B, and the heavier the strain on the bolts B B and lugs C C the more firm will be the grip of teeth $e$ of cross-bars D D on belt A. $c$ $c$ is face of taper opening of lug C and is polished. Center-bearing ends $d^2$ $d^2$ of cross-bars D D are also polished.

In practice the cross-bars D D are placed on belt A a suitable distance apart, as shown in Fig. 1, bolts $d$ $d$ merely holding them in position. The lugs C C are then placed upon center-bearing ends $d^2$ $d^2$ of cross-bars D D, as shown in Fig. 5, when by applying a wrench to squares $b$ $b$ of bolts B B it causes taper opening of lugs C C to slide on center-bearing ends $d^2$ $d^2$ of cross-bars D D, causing the teeth $e$ to grip the belt firm and prevent the cross-bars D D from slipping on the belt under all possible circumstances.

Having fully described my invention, what I claim as new, and desire to secure by Letters Patent, is—

The combination in a belt clamp and tightener, of the lugs C, C, with the taper opening and polished face $c$, $c$, with center-bearing polished ends $d^2$, $d^2$, of cross-bars D, D, substantially as shown and described and for the purpose set forth.

ANDREW F. SNYDER.

Witnesses:
H. P. HICKEY,
JAMES SPENCE.